US006801874B2

United States Patent
Strasser

(10) Patent No.: US 6,801,874 B2
(45) Date of Patent: Oct. 5, 2004

(54) POSITION MEASURING DEVICE AND METHOD FOR THE START-UP OF A POSITION MEASURING DEVICE

(75) Inventor: Erich Strasser, Trostberg (DE)

(73) Assignee: Johannes Heidenhain GmbH, Traunreut (DE)

(*) Notice: Subject to any disclaimer, the term of this patent is extended or adjusted under 35 U.S.C. 154(b) by 0 days.

(21) Appl. No.: 10/005,489

(22) Filed: Nov. 8, 2001

(65) Prior Publication Data

US 2002/0072877 A1 Jun. 13, 2002

(30) Foreign Application Priority Data

Nov. 11, 2000 (DE) .......................................... 100 55 996

(51) Int. Cl.[7] .............................................. G06F 15/00
(52) U.S. Cl. .................................. 702/150; 340/870.11
(58) Field of Search ..................... 702/150; 340/870.11; 307/149; 327/143; 361/92

(56) References Cited

U.S. PATENT DOCUMENTS

| | | | |
|---|---|---|---|
| 5,131,017 A | | 7/1992 | Huber et al. |
| 5,687,103 A | | 11/1997 | Hagl et al. |
| 5,760,707 A | | 6/1998 | Katagiri |
| 6,104,221 A | * | 8/2000 | Hoon ........................ 327/143 |
| 6,114,947 A | | 9/2000 | Tondorf |
| 6,327,127 B1 | * | 12/2001 | Utsunomiya et al. ......... 361/92 |
| 6,353,397 B1 | * | 3/2002 | Bielski et al. ......... 340/870.11 |
| 6,459,175 B1 | * | 10/2002 | Potega ........................ 307/149 |

FOREIGN PATENT DOCUMENTS

| | | |
|---|---|---|
| DE | 38 25 869 | 2/1990 |
| DE | 40 11 411 A1 | 10/1991 |
| DE | 44 22 056 | 1/1995 |
| DE | 43 42 377 | 6/1995 |
| DE | 44 25 416 | 2/1996 |
| DE | 44 27 278 | 2/1996 |
| DE | 195 21 252 | 12/1996 |
| DE | 196 13 884 | 10/1997 |
| DE | 197 11 215 | 5/1998 |
| JP | 9-91045 | 4/1997 |
| JP | 09091045 A | * 4/1997 ............. G05F/1/10 |

OTHER PUBLICATIONS

Patent Abstracts of Japan regarding Japanese publication 09 091045, published by Japanese Patent Office, vol. 1997, No. 8, Aug. 29, 1997, one page.

* cited by examiner

Primary Examiner—John Barlow
Assistant Examiner—Xiuqin Sun
(74) Attorney, Agent, or Firm—Brinks Hofer Gilson & Lione

(57) ABSTRACT

A position measuring device for determining the position of two elements, which are movable with respect to each other, the device including a voltage source and a scanning unit that includes one or more individual electrical components and a voltage monitoring unit that selectively supplies the one or more individual electrical components with a voltage from the voltage source.

7 Claims, 1 Drawing Sheet

POSITION MEASURING DEVICE AND METHOD FOR THE START-UP OF A POSITION MEASURING DEVICE

Applicant claims, under 35 U.S.C. § 119, the benefit of priority of the filing date of Nov. 11, 2000 of a German patent application, copy attached, Serial Number 100 55 996.4, filed on the aforementioned date, the entire contents of which is incorporated herein by reference.

BACKGROUND OF THE INVENTION

1. Field of the Invention

The present invention relates to a position measuring device for determining the position of two elements, which are movable with respect to each other, having a scanning unit, which transmits data to an evaluation unit via an interface, and having a voltage source for the scanning unit. The present invention also relates to a method for the start-up of a position measuring device.

2. Discussion of Related Art

Such position measuring devices are for example used in connection with machine tools in order to determine the absolute position of a workpiece, or its position with respect to a tool.

A position measuring device of the type mentioned has been described in DE 43 42 377 A1 of Applicant, which corresponds to U.S. Pat. No. 5,687,103 the entire contents of which are incorporated herein by reference. A position measuring device is completely integrated into a scanning unit, and the signals of a detector scanning a graduation are digitized and position data are calculated from this. The data, which contain for one the position data from the actual position measurement, and also further information regarding the position measuring device itself, by which a processing unit can be adapted to the position measuring device, are transmitted from the position measuring device to the processing unit via an interface.

One problem regarding this and similar position measuring devices is the provision of an assurance of a supply voltage required for the dependable operation of the scanning unit of the measuring device. If this voltage is not high enough, for example because the user has employed an electrical cable of too narrow a cross-section and therefore too high a cable resistance, malfunctions of the scanning unit can occur, which result in a wrong position determination. Control commands issued on the basis of such erroneous position determinations can lead to damage of the tool, or the workpiece in machine tools, for example. But the supply voltage can also be so low that it is not possible to initiate the position measuring device at all.

A method for the transmission of multiple serial signals, which are employed for a position control and regulation of a motor, is described in DE 44 22 056 A1, which corresponds to U.S. Pat. No. 5,760,707 the entire contents of which are incorporated herein by reference. The transmission of a control bit for the supply voltage, which is supplied by a voltage drop detector, is disclosed there. However, it is disadvantageous that in case of too low a supply voltage after switch-on, the interface itself, which is intended for transmitting this control bit, does not operate. Therefore, an evaluation unit, which receives the control bit, is not even informed of the status "supply voltage below normal." The user is not provided any information for the search for the fault.

For monitoring the supply voltage when switching on any arbitrary electronic component and to prevent an insufficient supply to them, it is known from JP 9 091045 A2 to determine the internal resistance of the voltage source from the voltage drop when an electronic component, whose current consumption is known, is switched on and, knowing the current consumption of further electrical components, to activate them only if the supply voltage would not fall below a threshold value.

OBJECTS AND SUMMARY OF THE INVENTION

It is an object of the present invention to disclose a position measuring device with a scanning unit, wherein a check of the voltage supply required for the dependable operation of the scanning unit already takes place when it is switched on.

This object is attained by a position measuring device for determining the position of two elements, which are movable with respect to each other, the device including a scanning unit that includes one or more individual electrical components, a voltage source and a voltage monitoring unit that selectively supplies the one or more individual electrical components with a voltage.

It is a further object of the present invention to disclose a method for the start-up of the scanning unit of a position measuring device, which permits the check of the supply voltage required for the dependable operation of the scanning unit already when it is switched on.

This object is attained by a method for the start-up of a position measuring device including a scanning unit, the method includes switching on a position measuring device that includes a scanning unit, subsequent to the switching on, performing a check of a supply voltage of the scanning unit supplied by a voltage source and activating one or more electrical components in the scanning unit, provided a sufficient supply voltage for the activating has been determined during the performing of the check.

Following the switch-on of the position measuring device, initially only the interface between the scanning unit and the evaluation unit, as well as a voltage monitoring unit, are provided with a voltage. The voltage monitoring unit then determines the size of the internal resistance of the voltage supply of the scanning unit and calculates that supply voltage from this, which should be available in the scanning unit after all electrical components have been switched on. Only if this value is sufficient for a dependable operation of the scanning unit, is the latter completely activated, otherwise an error message is issued via the interface. The user of such a system has the great advantage that, when the scanning unit is insufficiently supplied, he is not confronted with erroneous measurements, which are hard to detect, and he saves time when searching for the errors in case only a wrong cable has been used for the voltage supply, or if bad contact resistances occur at the cable connections.

Further advantages, as well as details of the present invention, ensue from the following description of a preferred embodiment represented in the drawings.

DETAILED DESCRIPTION OF THE PREFERRED EMBODIMENTS

Figure 1:
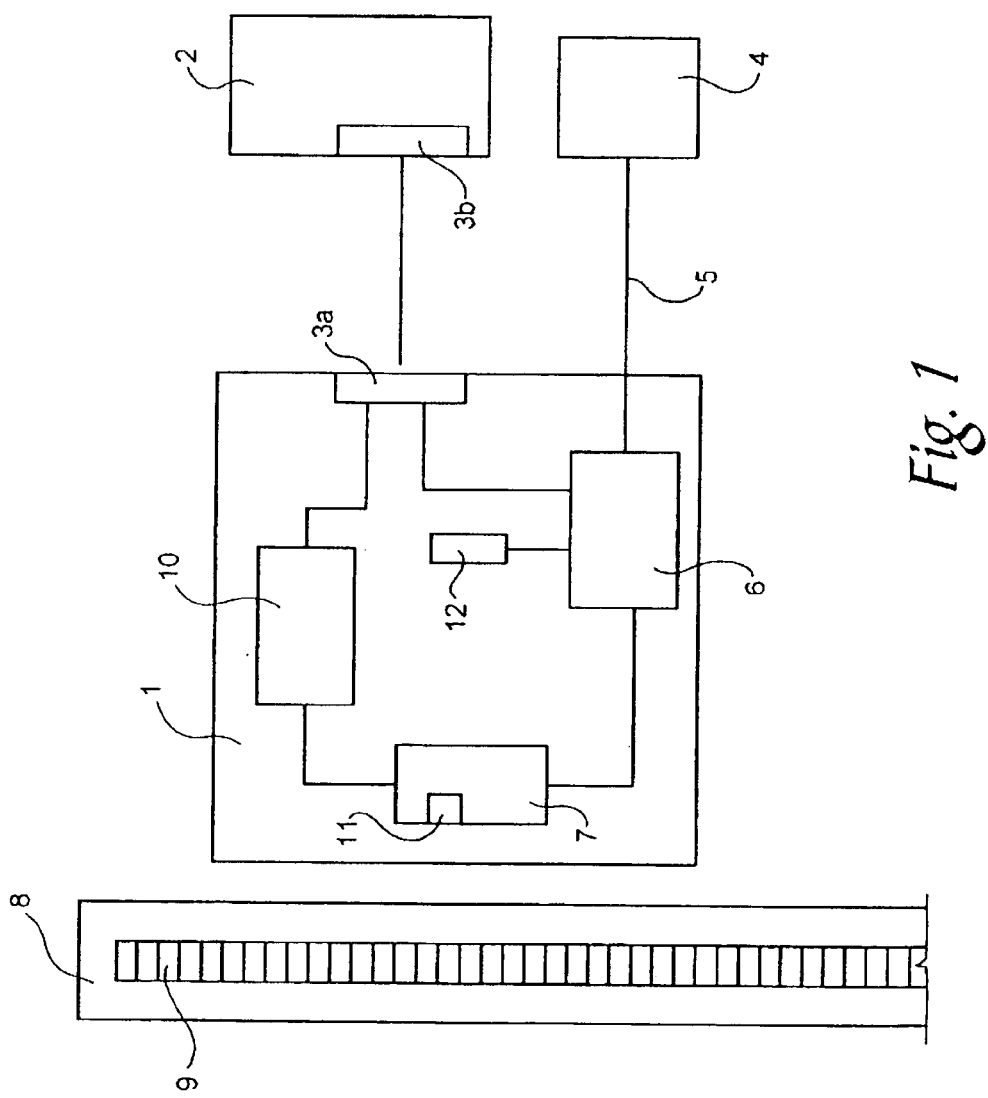
FIG. 1 represents a wiring diagram of an embodiment of a position measuring device in accordance with the present invention.

FIG. 1 shows a position measuring device, including a scanning unit 1 and a graduation support 8 with a graduation 9. A reading head 7, which reads the graduation 9 of the graduation support 8, is located in the scanning unit 1. A position is calculated in a position calculating unit 10 from the information read out by the reading head 7 and is then transmitted via interfaces 3a and 3b to the evaluation unit 2. The graduation support 8 and the scanning unit 1 are movable with respect to each other; the graduation support 8 can be fastened on a movable machine element of a machine tool, not represented, and the scanning unit 1 on the machine bed of the latter.

The scanning unit 1 is provided with an electrical voltage from a voltage source 4 through a supply line 5. The voltage available in the scanning unit 1 is a function of the power consumption of the individual electrical components, as well as of the internal resistance of the voltage source 4 itself and the line resistance of the supply line 5. Among the electrical components in the scanning unit 1 are the reading head 7 with a light source 11, the position calculating unit 10, the serial interface 3a, as well as the voltage monitoring unit 6.

In the course of initializing the described position measuring device, initially only the serial interface 3a and the voltage monitoring unit 6 are activated in the scanning unit after the voltage source 4 has been switched on. In this case the power consumption is clearly less than with the complete actuation of all electrical components of the scanning unit 1. For example, in an optical position measuring device, during initialization it is not necessary to supply the light source 11 in the reading head 7, which is responsible for great energy usage. In a position measuring device based on magnetic scanning, the Hall sensors can initially remain switched off.

In this way it is assured that the voltage monitoring unit 6 and the serial interface 3a can be operated even with an insufficient voltage supply (for example because of too great a voltage drop in the supply line 5).

The voltage monitoring unit 6 now first measures the supply voltage U1 available in the scanning unit 1. Subsequently, an additional defined load 12 is added, and the supply voltage U2 is measured again. The effective internal resistance Reff of the voltage source 4 can be calculated as the quotient of the difference of the two measured voltages and the known voltage consumption $\Delta I$ of the defined load 12, wherein the line resistance of the supply line 5 has already been taken into consideration. The following therefore applies:

$$\text{Reff} = (U1 - U2)/\Delta I.$$

The activation of the interface 3a can of course take place after the check of the voltage source 4 by the voltage monitoring unit 6 and the small load 12, since at the earliest it is needed for transmitting an error message. Moreover, it would also be conceivable to use the interface 3a as the defined load 12.

Since the power consumption of all further electrical components of the scanning unit 1 is also known, and therefore also the power consumption Iges of the entire scanning unit during measuring operations, it is now possible to calculate which supply voltage Ueff will be available after all electrical components have been activated:

$$\text{Ueff} = \text{Reff} * \text{Iges}$$

If the precalculated supply voltage Ueff lies above a threshold voltage Ug required for the dependable operation of the scanning unit 1, the initialization of the position measuring device can be terminated in that all electrical components are provided with voltage and measuring operations can commence in this way. If the precalculated supply voltage lies below the threshold voltage Ug, an appropriate report can be transmitted by the voltage monitoring unit 6 to the evaluation unit 2 via the serial interface 3a, which is already capable of functioning at this time.

The threshold voltage Ug is advantageously selected in such a way that the effects, which can lead to a drop of the supply voltage during measuring operations, have already been taken into consideration. For example, it is necessary to increase the power consumption of an LED used as the light source 11 if the receiver diodes become less sensitive because of heating. Aging of the LED, or the condensation or contamination of the graduation support 8 during the service life of the position measuring device must be compensated by increased current consumption by the light source 11 in order to keep the signal strength at the output of the reading head 7 constant. A current consumption increased in this way reduces the available supply voltage. It is possible to select the threshold voltage Ug from the start in such a way that the increased current consumption of an aged LED is already taken into consideration, or in a more advantageous way can be correspondingly raised during the service life of the measuring device. The tolerance of the voltage source 4 itself should also be taken into consideration, it is typically approximately ±5% of the desired value.

The described form of voltage monitoring can be performed without components especially used for this purpose, since all needed components are already present in a scanning unit 1 of the position measuring device of the type described, and for the purpose of voltage monitoring only need to be controlled differently during the initialization of the position measuring device. This relates for example to the A/D converters for measuring the supply voltage, which are used in the actual operation for digitizing the reading head 7. The function of the voltage monitoring unit 6 can be assumed by a processor or an ASIC, which performs other functions during the measuring operation.

The present invention is suitable for linear and rotatory position measuring device with the most diverse scanning principles, for example optical, magnetic, inductive or capacitive systems.

The foregoing description is provided to illustrate the invention, and is not to be construed as a limitation. Numerous additions, substitutions and other changes can be made to the invention without departing from its scope as set forth in the appended claims.

I claim:

1. A method for the start-up of a position measuring device comprising a scanning unit, the method comprising:
   switching on a position measuring device that comprises a scanning unit;
   subsequent to said switching on, performing a check of a supply voltage of said scanning unit supplied by a voltage source, wherein said performing said check comprises:
   measuring a supply voltage of said scanning unit for a first time;
   providing a defined load with a voltage; and
   calculating an internal resistance of said voltage source; and
   activating one or more electrical components in said scanning unit, provided a sufficient supply voltage for said activating has been determined during said performing said check; and
   measuring a second supply voltage of said scanning unit at a second time, wherein said calculating said internal resistance is based on said supply voltage of said scanning unit measured at said first time, said second supply voltage and a current consumption of said defined load.

2. The method of claim 1, further comprising calculating an available supply voltage value from said calculated internal resistance of said voltage source and a current demand of said scanning unit during a position measuring operation performed by said scanning unit which would be available to said scanning unit after said activating said one or more electrical components.

3. The method of claim 2, further comprising issuing an error message if said calculated available supply voltage value lies below a threshold voltage needed for dependable operation of said scanning unit.

4. The method of claim 3, further comprising taking into consideration effects, which let said supply voltage drop during said position measuring operation when selecting said threshold voltage.

5. The method of claim 3, further comprising taking into consideration effects, which let said supply voltage drop during a service life of said position measuring device when selecting said threshold voltage.

6. The method of claim 3, further comprising terminating initialization of said position measuring device if said calculated available supply voltage value lies below a threshold voltage needed for dependable operation of said scanning unit.

7. The method of claim 2, further comprising terminating initialization of said position measuring device if said calculated available supply voltage value lies below a threshold voltage needed for dependable operation of said scanning unit.

* * * * *